(12) United States Patent
Weik

(10) Patent No.: US 6,587,549 B1
(45) Date of Patent: Jul. 1, 2003

(54) DEVICE FOR AUTOMATICALLY PROCESSING INCOMING ELECTRONIC MAIL (=E-MAIL)

(75) Inventor: Hartmut Weik, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/567,324

(22) Filed: May 9, 2000

(30) Foreign Application Priority Data

May 14, 1999 (DE) .......................................... 199 22 300

(51) Int. Cl.$^7$ .............................................. H04M 11/00
(52) U.S. Cl. .................................................... 379/93.24
(58) Field of Search ........................ 379/93.24; 709/206, 709/207, 238, 240

(56) References Cited

U.S. PATENT DOCUMENTS

| | | | | |
|---|---|---|---|---|
| 5,377,354 A | * | 12/1994 | Scannell et al. ............. | 395/650 |
| 5,995,597 A | * | 11/1999 | Woltz et al. ............... | 379/93.24 |
| 6,023,723 A | * | 2/2000 | McCormick et al. ........ | 709/206 |
| 6,092,101 A | * | 7/2000 | Birrell et al. ............... | 379/93.24 |
| 6,128,646 A | * | 10/2000 | Miloslavsky ............... | 379/93.24 |
| 6,199,103 B1 | * | 3/2001 | Sakaguchi et al. .......... | 709/206 |
| 6,226,630 B1 | * | 5/2001 | Billmers ..................... | 707/3 |
| 6,233,322 B1 | * | 5/2001 | Cannon et al. ............. | 379/93.24 |
| 6,249,805 B1 | * | 6/2001 | Fleming, III ................ | 709/206 |
| 6,351,764 B1 | * | 2/2002 | Voticky et al. ............. | 709/207 |
| 6,393,465 B2 | * | 5/2002 | Leeds ......................... | 709/207 |

FOREIGN PATENT DOCUMENTS

JP    100 04 428    1/1998

* cited by examiner

Primary Examiner—Stella Woo
(74) Attorney, Agent, or Firm—Sughrue Mion, PLLC

(57) ABSTRACT

A device and process for receiving and/or forwarding electronic mail (=e-mail) are characterised in that, in the case of all the e-mail messages (4) incoming in a receiving unit (1), information is extracted automatically in accordance with predetermined search criteria, that as a function of the extracted information and predetermined assignment criteria, an automatic assignment of the incoming e-mail to at least one of a plurality of addresses takes place, and that the incoming e-mail is automatically stored in a storage area (11, 12, 13, 14) designated by the corresponding address(es) or forwarded to the address(es). In this way the incoming e-mail can be automatically pre-sorted and appropriately stored or forwarded to assigned addresses without the user having to perform manual tasks or the subsequent processing via a macro of the e-mail which has already arrived and been stored in a mailbox. (FIG. 1)

18 Claims, 2 Drawing Sheets ns network
DEVICE FOR AUTOMATICALLY PROCESSING INCOMING ELECTRONIC MAIL (=E-MAIL)

BACKGROUND OF THE INVENTION

The invention relates to a process and device for receiving and/or forwarding electronic mail (=e-mail) comprising a receiving unit which can receive incoming e-mail messages.

JP 100 04 428 A has disclosed a device for receiving e-mail wherein a receiving unit receives the incoming e-mail messages and stores them in a mailbox. Only thereafter does an analysis take place of the title and syntax of the received e-mail, with extraction of keywords from the analyzed incoming e-mail by a characteristics- and extraction unit. Then the received e-mail is removed from the mailbox and displayed on a display unit. The advantages of this procedure are considered to consist in an efficient search and information matching process and the possibility of automatically classifying incoming e-mail.

However this known approach has the disadvantage that the incoming e-mail is firstly stored in the usual way in a mailbox for "incoming mail" and that an analysis of the received e-mail by a macro or a user only takes place thereafter.

SUMMARY OF THE INVENTION

In contrast, the object of the present invention is to improve the handling of e-mail communications and in particular to separate important messages from unimportant messages more rapidly than previously possible, prior to the storage of the incoming e-mail in a mailbox, in order to achieve a more effective control over the message flow.

In terms of the device, this object is achieved in accordance with the invention in that the receiving unit comprises means for extracting information from the incoming e-mail in accordance with predeterminable search criteria, and means for assigning incoming e-mail to at least one of a plurality of addresses as a function of the extracted information and one or more predeterminable assignment criteria.

In this way the incoming e-mail can be automatically pre-sorted and appropriately stored or forwarded to assigned addresses without the user having to perform manual actions or the subsequent processing via a macro of the e-mail which has already arrived and been stored in a mailbox. As a result, on the one hand all the incoming messages are treated in the same way and on the other hand a considerable time saving is achieved due to the automated e-mail screening in the front end of an input store. By means of various predeterminable search- and assignment criteria, the incoming e-mails can be pre-sorted in an arbitrarily modifiable manner which can be adapted to the relevant requirements, whereby the data flow can be effectively reduced. The efficiency of teleworkers is also decisively improved in this way.

In a particularly preferred embodiment of the device according to the invention, the addresses to which the incoming e-mail is assigned designate storage areas of a data storage unit which are set up as electronic files. Storage in such electronic files further simplifies and clarifies the handling of the received e-mail.

In a further development of this embodiment, means are provided for storing the incoming e-mail in the corresponding file(s).

The scope of the present invention also includes a data terminal for connection to a telecommunications network with a device for receiving electronic mail (=e-mail) of the above described type according to the invention.

The scope of the present invention also includes a router for connection to a telecommunications network with a device for receiving and forwarding electronic mail (=e-mail) of the above described type according to the invention.

Finally the scope of the present invention also includes a process for receiving and/or forwarding electronic mail (=e-mail) wherein the above described object of the invention is achieved in that in the case of all the e-mail messages incoming in a receiving unit, information is extracted automatically in accordance with predetermined search criteria, that as a function of the extracted information and predetermined assignment criteria, an automatic assignment of the incoming e-mail to at least one of a plurality of addresses takes place, and that the incoming email is automatically stored in a storage area designated by the corresponding address(es) or is forwarded to the address(es).

The filter function implemented by the search- and assignment criteria sorts the incoming e-mail messages in accordance with the extracted information and assigns them to predeterminable addresses to which the e-mail is either forwarded by means of a router or under which it is stored by means of a storage unit. The automatic analysis of the incoming e-mail messages in accordance with a plurality of predeterminable parameters is performed objectively and without time loss by a machine entity, which replaces a complex search and decision process on the part of a human operator.

In a particularly preferred variant of the process according to the invention, the addresses to which the incoming e-mail is assigned designate storage areas of a data storage unit which are set up as electronic files, thus facilitating a particularly simple and clearly defined further processing of the received e-mail.

In a further, particularly preferred variant of the process according to the invention, at least one of the search-and/or assignment criteria relates to sender-specific data of the incoming e-mail, in particular to the name or e-mail address of the sender since these can generally be considered as the most important data for the pre-sorting of the incoming e-mail.

An advantageous further development of this process variant is characterised in that the sender-specific data are compared with a black list and that in the event that the result of this comparison is positive, the incoming e-mail is immediately erased or without further processing is stored under, or forwarded to, a special address which in particular performs scrap functions. In this way unwanted messages and those presumed to be unimportant can be immediately removed from the general message flow so that a considerably smaller number of incoming e-mails are passed on for actual further processing.

Conversely, in another process variant it is advantageous that the sender-specific data are compared with a white list and that in the event that the result of this comparison is positive, the incoming e-mail is immediately passed on for further processing as a function of the assignment criteria. In this way particularly urgent and important messages can be singled out and handled with priority.

In a further development of this process variant, in the event that the result of the comparison with the white list is positive, it is useful for a backup copy of the incoming e-mail to be stored under, or forwarded to, a special address in parallel to the further processing of the e-mail. Should an error occur in the (preferably high-speed) processing of the e-mail message singled out as particularly important, for example the erroneous erasure of the message, it is easily possible to refer to the backup copy.

To alert the relevant recipient or responsible operator to the reception of particularly important messages, in another further development of the above process variant, in the event that the comparison with the white list has a positive result, a signalling device, in particular an optical and/or acoustic signal generator, is actuated.

Another advantageous variant of the process according to the invention is characterised in that at least one of the search- and/or assignment criteria relates to the content of the incoming e-mail, in particular a specific keyword, and that upon the discovery of this keyword in the incoming email, either the e-mail directly or a backup copy thereof is stored under, or forwarded, to a specific address. In this way it is possible purposively to search for "stimuli words" in the flow of incoming messages and upon the discovery of such a word to forward the corresponding message, or a copy thereof, directly to a specific location.

Another advantageous variant of the process according to the invention is characterised in that at least one of the search criteria relates to the data content at a specific position within the incoming e-mail, for example to the "salutation", the "reference", the "enclosure", or "cc". These positions, which normally are well defined in e-mail messages, contain data of particular significance for the further handling of the message (for example the desired recipient in the case of the "salutation", the general topic of the message in the case of the "reference", a potentially important document in the case of the "enclosure", or the other recipients of the message in the case of the "cc", the composition of which also enables conclusions to be drawn about the importance and relevance of the message.

Another advantageous variant of the process according to the invention provides that in the event that one of the assignment criteria applies, the incoming e-mail is forwarded to one or more predetermined other e-mail address (es). In this way specific important messages can be circulated effectively and at lightning speed, for example in a "snowball system".

It is also particularly favourable that, in the event that one of the search or assignment criteria applies, the incoming e-mail is further processed with special priority. In this way particularly important messages can be processed without time loss, the relevance of the messages being checked automatically and objectively in a mechanical fashion on the basis of the predeterminable search parameters.

Further advantages of the invention will be referred to in the description of the drawing. Likewise, the above mentioned features and those to be described in the following can be employed in accordance with the invention either individually or jointly in arbitrary combinations. The illustrated and described embodiments are not to be understood as conclusive but rather are to be considered as descriptive examples of the invention.

BRIEF DESCRIPTION OF THE DRAWINGS

The invention is illustrated in the drawing and will be explained in detail in the form of exemplary embodiments.

In the drawing.

SUMMARY OF THE INVENTION

Figure 1:
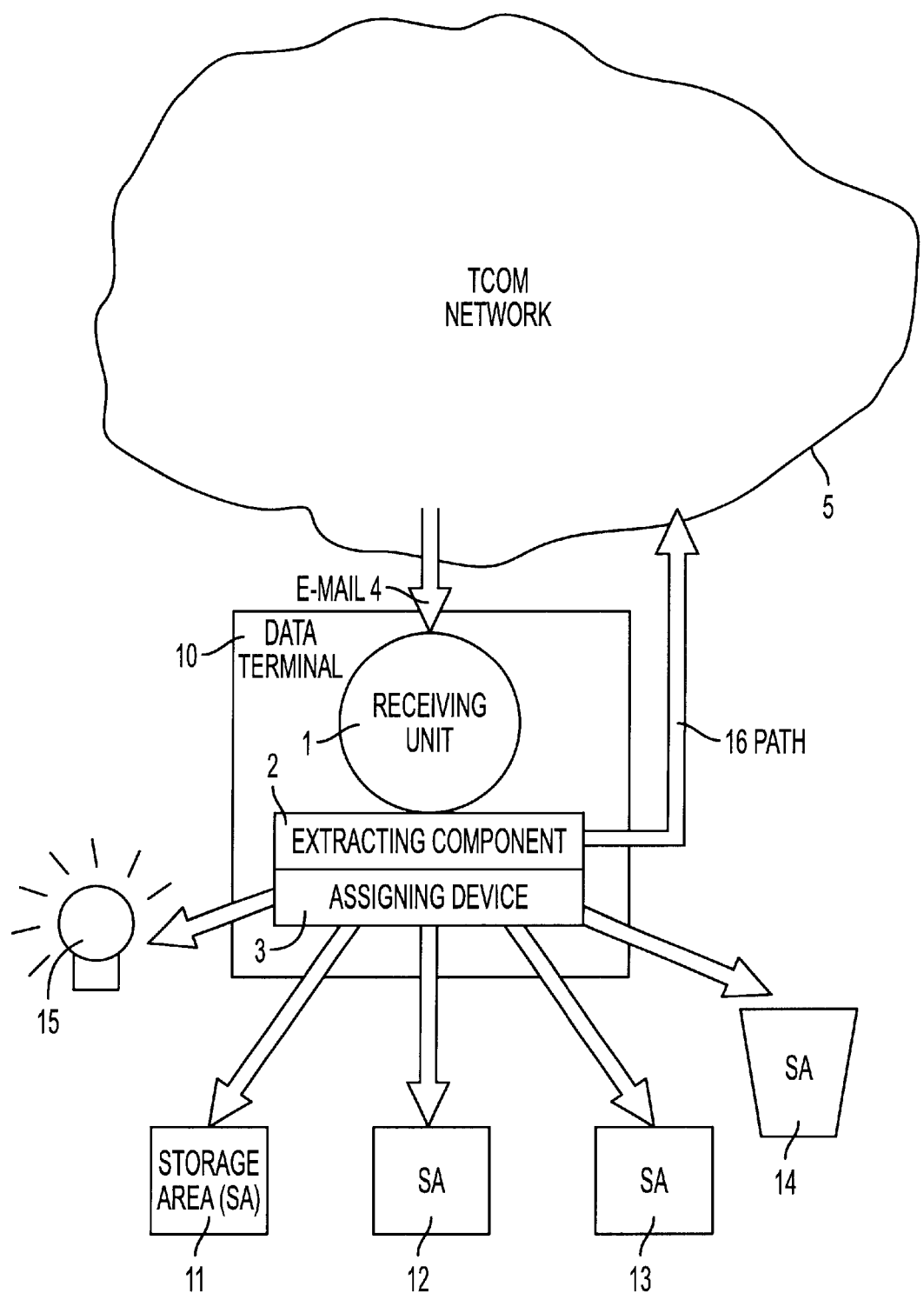
FIG. 1 shows a first embodiment of the device according to the invention in a terminal for connection to a TC network and FIG. 2 is a schematic diagram of a second embodiment of the device according to the invention in a router in a TC network.

FIG. 1 schematically illustrates a data terminal 10 which is connected via a receiving unit 1 to a telecommunications (=TC) network 5. The receiving unit 1 comprises means 2 for extracting information from an e-mail 4 incoming from the TC network 5 in accordance with predeterminable search criteria, and means 3 for assigning incoming e-mail 4 to at least one of a plurality of addresses as a function of the extracted information and one or more predeterminable assignment criteria. The means 2, 3 serve as automatic filter and distributor so that all the e-mail messages incoming in the terminal 10 from the TC network 5 are immediately pre-sorted.

In the illustrated example, the incoming e-mail 4 is distributed between storage areas 11, 12, 13, 14 of a data storage unit, the storage areas 11, 12, 13 being set up as "electronic files", while the storage area 14 performs "scrap" functions for unwanted and/or unimportant messages which can be filtered out by comparing specific parameters of the e-mail with a black list.

If on the other hand the incoming e-mail 4 contains particularly important information which is to be further processed with a high priority, which can be ascertained for example by comparing the extracted information with a white list, a signalling device 15, which can comprise optical and acoustic signal generators, is actuated so that an operator is alerted to the received, important e-mail.

Another possibility of processing incoming e-mail 4 consists in that the incoming e-mail itself, or a message generated on the basis of the e-mail, is input into the TC network 5 via the path 16 shown schematically in FIG. 1, for example for an automatic reaction to the incoming e-mail 4 or to alert other concerned parties to whom the information contained in the incoming e-mail 4 could also be of relevance.

Figure 2:
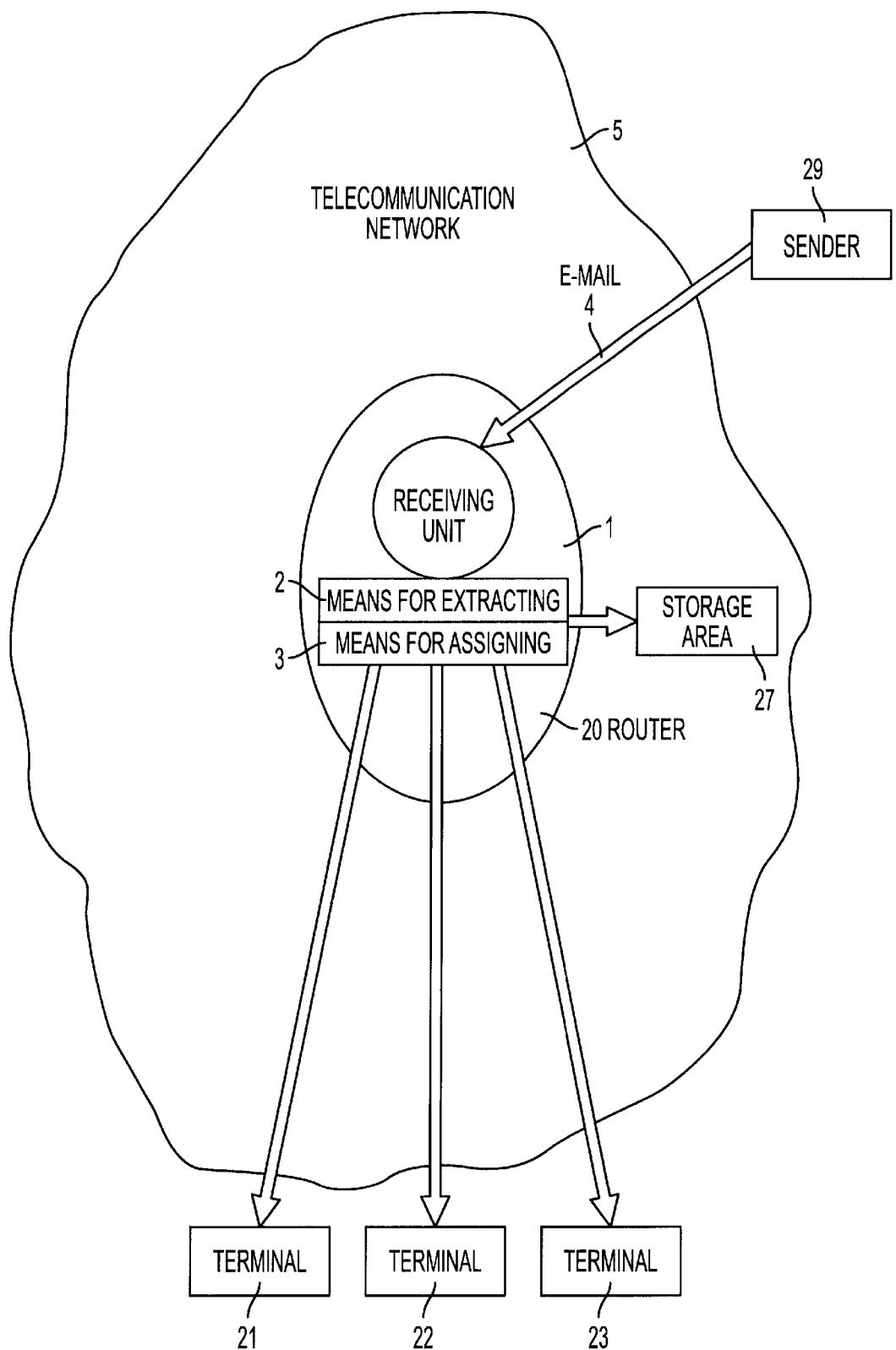

FIG. 2 schematically illustrates another embodiment wherein the receiving unit 1 with the means 2 for extracting information and the means 3 for assigning incoming e-mail 4 to at least one of a plurality of addresses is arranged in a router 20 within the TC network 5. Here again the means 2, 3 assume a filter function for the incoming e-mail 4. The e-mail 4 input into the TC network 5 by a sender 29 can thus for example be forwarded to the addresses of further terminals 21, 22, 23 connected to the TC network. Additionally or alternatively however, depending upon the presetting of the assignment criteria, the incoming e-mail 4 can also be stored or buffered in a storage area 27 within the TC network 5.

What is claimed is:

1. A router for connection to a telecommunications network, said router comprising a device for receiving and forwarding electronic mail, wherein said device comprises:

means for extracting information from the incoming e-mail in accordance with predeterminable search criteria, and means for assigning incoming e-mail to at least one of a plurality of addresses as a function of the extracted information and one or more predeterminable assignment criteria.

2. The router according to claim 1, wherein addresses to which the incoming e-mail is assigned designate storage areas of a data storage unit which are set up as electronic files.

3. The router according to claim 2, wherein means are provided for storing the incoming e-mail in the corresponding file(s).

4. The router according to claim 1, wherein the content is at least subject matter contained in the body of the e-mail.

5. The router according to claim 1, wherein said device comprises a receiving unit comprising said means for extracting and said means for assigning.

6. A router for performing a process of receiving and/or forwarding electronic mail, said router comprising a receiving unit, wherein when e-mail messages are received in the receiving unit, information is extracted automatically in accordance with predetermined search criteria, as a function of the extracted information and predetermined assignment criteria, an automatic assignment of the incoming e-mail to at least one of a plurality of addresses takes place, and the incoming e-mail is at least automatically stored in a storage area designated by corresponding address(es) or is forwarded to the address(es).

7. The router according to claim 6, wherein the addresses to which the incoming e-mail is assigned designate storage areas of a data storage unit which are set up as electronic files.

8. The router according to claim 6, wherein at least one of the search criteria and assignment criteria relates to sender-specific data of the incoming e-mail, said spender-specific data comprising the name and e-mail address of the sender.

9. The router according to claim 8, wherein the sender-specific data are compared with a black list, and in the event that the result of this comparison is positive, the incoming e-mail is immediately erased or without further processing is stored under, or forwarded to, a special address which in particular performs scrap functions.

10. The router according to claim 6, wherein the sender-specific data are compared with a white list and in the event that the result of this comparison is positive, the incoming e-mail is immediately passed on for further processing as a function of the assignment criteria.

11. The router according to claim 10, wherein in the event that the result of the comparison with the white list is positive, a backup copy of the incoming e-mail is stored under, or forwarded to, a special address in parallel to the further processing of the e-mail.

12. The router according to claim 10, wherein in the event that the result of the comparison with the white list is positive, a signalling device (15) is actuated.

13. The router according to claim 12, wherein said signaling device is at least one of an optical signal generator and an acoustic signal generator.

14. The router according to claim 6, wherein at least one of the search criteria and assignment criteria relates to content of the incoming e-mail, said content comprising a specific keyword, and upon discovery of said specific keyword in the incoming e-mail (4), either the e-mail directly or a backup copy thereof is stored under, or forwarded to, a specific address.

15. The router according to claim 6, wherein at least one of the search criteria relates to the data content at a specific position within the incoming e-mail.

16. The router according to claim 15, wherein said specific position within the incoming e-mail comprises a "salutation", a "reference", an "enclosure", and a "cc".

17. The router according to claim 6, wherein in the event that one of the assignment criteria applies, the incoming e-mail is forwarded to one or more predetermined other e-mail address(es).

18. The router according to claim 6, wherein in the event that one of the search- or assignment criteria applies, the incoming e-mail is further processed with special priority.

* * * * *